(12) United States Patent
Saikin

(10) Patent No.: US 7,517,488 B2
(45) Date of Patent: Apr. 14, 2009

(54) METHOD OF FORMING A CHEMICAL MECHANICAL POLISHING PAD UTILIZING LASER SINTERING

(75) Inventor: Alan H. Saikin, Landenberg, PA (US)

(73) Assignee: Rohm and Haas Electronic Materials CMP Holdings, Inc., Newark, DE (US)

(*) Notice: Subject to any disclaimer, the term of this patent is extended or adjusted under 35 U.S.C. 154(b) by 526 days.

(21) Appl. No.: 11/372,322

(22) Filed: Mar. 8, 2006

(65) Prior Publication Data

US 2007/0210491 A1    Sep. 13, 2007

(51) Int. Cl.
    *B29C 35/08*    (2006.01)
(52) U.S. Cl. .................. 264/497; 264/460; 264/482; 264/113; 264/413
(58) Field of Classification Search .............. 264/460, 264/482, 113, 497
    See application file for complete search history.

(56) References Cited

U.S. PATENT DOCUMENTS

| | | | |
|---|---|---|---|
| 5,733,497 A * | 3/1998 | McAlea et al. .............. 264/497 |
| 6,017,265 A | 1/2000 | Cook et al. | |
| 6,325,703 B2 | 12/2001 | Cook et al. | |
| 7,275,856 B2 | 10/2007 | Koetas et al. | |
| 7,275,928 B2 | 10/2007 | Kolesar et al. | |
| 2001/0024940 A1* | 9/2001 | Cook et al. .................. 451/526 |
| 2005/0074550 A1* | 4/2005 | Leuterer et al. ............. 427/180 |
| 2006/0066001 A1 | 3/2006 | Koetas et al. | |
| 2006/0108701 A1 | 5/2006 | Saikin et al. | |
| 2006/0226567 A1 | 10/2006 | James et al. | |
| 2006/0226568 A1 | 10/2006 | James et al. | |
| 2006/0228439 A1 | 10/2006 | James et al. | |
| 2007/0034614 A1 | 2/2007 | McClain et al. | |
| 2007/0066196 A1 | 3/2007 | Saikin | |
| 2007/0235904 A1 | 10/2007 | Saikin et al. | |

OTHER PUBLICATIONS

Lepson et al.; Multi-Material Selective Laser Sintering: Empirical Studies and Hardware Development; Proceedings of the 2000 NSF Design and Manufacturing Grantees Conference, Jan. 2000.

* cited by examiner

*Primary Examiner*—Philip C Tucker
*Assistant Examiner*—Xue Liu
(74) *Attorney, Agent, or Firm*—Edwin Oh; Thomas S. Diebert

(57) ABSTRACT

The present invention provides a method of manufacturing a porous chemical mechanical polishing pad comprising focusing a laser beam from a laser into a sintering nozzle and injecting the fluidized thermoplastic particles into the sintering nozzle via an injection port. The method further provides sintering the thermoplastic particles with the laser beam and selectively depositing the sintered thermoplastic particles onto a table to form the polishing pad.

10 Claims, 2 Drawing Sheets

METHOD OF FORMING A CHEMICAL MECHANICAL POLISHING PAD UTILIZING LASER SINTERING

FIELD OF THE INVENTION

The present invention relates to a method of forming polishing pads used for chemical-mechanical planarization (CMP), and in particular relates to a method of forming a polishing pad using laser sintering.

BACKGROUND OF THE INVENTION

In the fabrication of integrated circuits and other electronic devices, multiple layers of conducting, semiconducting, and dielectric materials are deposited on or removed from a surface of a semiconductor wafer. Thin layers of conducting, semiconducting, and dielectric materials may be deposited by a number of deposition techniques. Common deposition techniques in modem processing include physical vapor deposition (PVD), also known as sputtering, chemical vapor deposition (CVD), plasma-enhanced chemical vapor deposition (PECVD), and electrochemical plating (ECP).

As layers of materials are sequentially deposited and removed, the uppermost surface of the substrate may become non-planar across its surface and require planarization. Planarizing a surface, or "polishing" a surface, is a process where material is removed from the surface of the wafer to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material used to fill the features and to provide an even surface for subsequent levels of metallization and processing.

Chemical mechanical planarization, or chemical mechanical polishing (CMP), is a common technique used to planarize substrates such as semiconductor wafers. In conventional CMP, a wafer carrier or polishing head is mounted on a carrier assembly and positioned in contact with a polishing pad in a CMP apparatus. The carrier assembly provides a controllable pressure to the substrate urging the wafer against the polishing pad. The pad is moved (e.g., rotated) relative to the substrate by an external driving force. Simultaneously therewith, a chemical composition ("slurry") or other fluid medium is flowed onto the substrate and between the wafer and the polishing pad. The wafer surface is thus polished by the chemical and mechanical action of the pad surface and slurry in a manner that selectively removes material from the substrate surface.

Conventional methods of manufacturing polishing pads include, for example, cast and skiving of mix polyurethane precursors and pore forming agents, impregnation and splitting of non-woven felt, and coating, coagulation and buffing on a modified non-woven felt. In addition, other methods for manufacturing polishing pads have been explored, including, photopolymerization of liquid precursors, net-shape molding, extrusion of thermo-formable polymers and sintering of polymeric powders (e.g., U.S. Pat. No. 6,017,265).

Sintering typically involves two or more thermoplastic polymers that are compacted under pressure, above the glass transition temperature. The mixture of the thermoplastics is place in a mold and exposed to the sintering condition. The end result is a pad with uniform dimensions and porosity. Unfortunately, the pad typically requires additional processing steps, such as, machining of grooves in order to create a functional pad. In addition, conventional sintering techniques are limited in forming polishing pads with varied porosity and material composition.

Accordingly, what is needed is a method of forming a polishing pad for chemical-mechanical planarization utilizing improved sintering techniques.

SUMMARY OF THE INVENTION

In one aspect of the invention, there is provided a method of manufacturing a porous chemical mechanical polishing pad comprising: focusing a laser beam from a laser into a sintering nozzle; injecting fluidized thermoplastic particles into the sintering nozzle via an injection port; sintering the thermoplastic particles with the laser beam; and selectively depositing the sintered thermoplastic particles onto a table to form the polishing pad.

In another aspect of the invention, there is provided a method of manufacturing a porous chemical mechanical polishing pad comprising: focusing a laser beam from a laser into a sintering nozzle; injecting a first fluidized thermoplastic particles into the sintering nozzle via a first injection port; injecting at least a second fluidized thermoplastic particles into the sintering nozzle via at least a second injection port; sintering the first and second thermoplastic particles with the laser beam; and depositing the sintered thermoplastic particles onto a movable table to form the polishing pad.

In another aspect of the invention, there is provided a method of manufacturing a porous chemical mechanical polishing pad comprising: focusing a laser beam from a laser into a sintering nozzle; injecting fluidized thermoplastic particles into the sintering nozzle via an injection port; sintering the thermoplastic particles at a temperature above the glass transition temperature of said thermoplastic particles but below the melting point of said thermoplastic polymeric particles; and depositing the sintered thermoplastic particles onto a movable table to form the polishing pad.

DETAILED DESCRIPTION OF THE INVENTION

Figure 1:
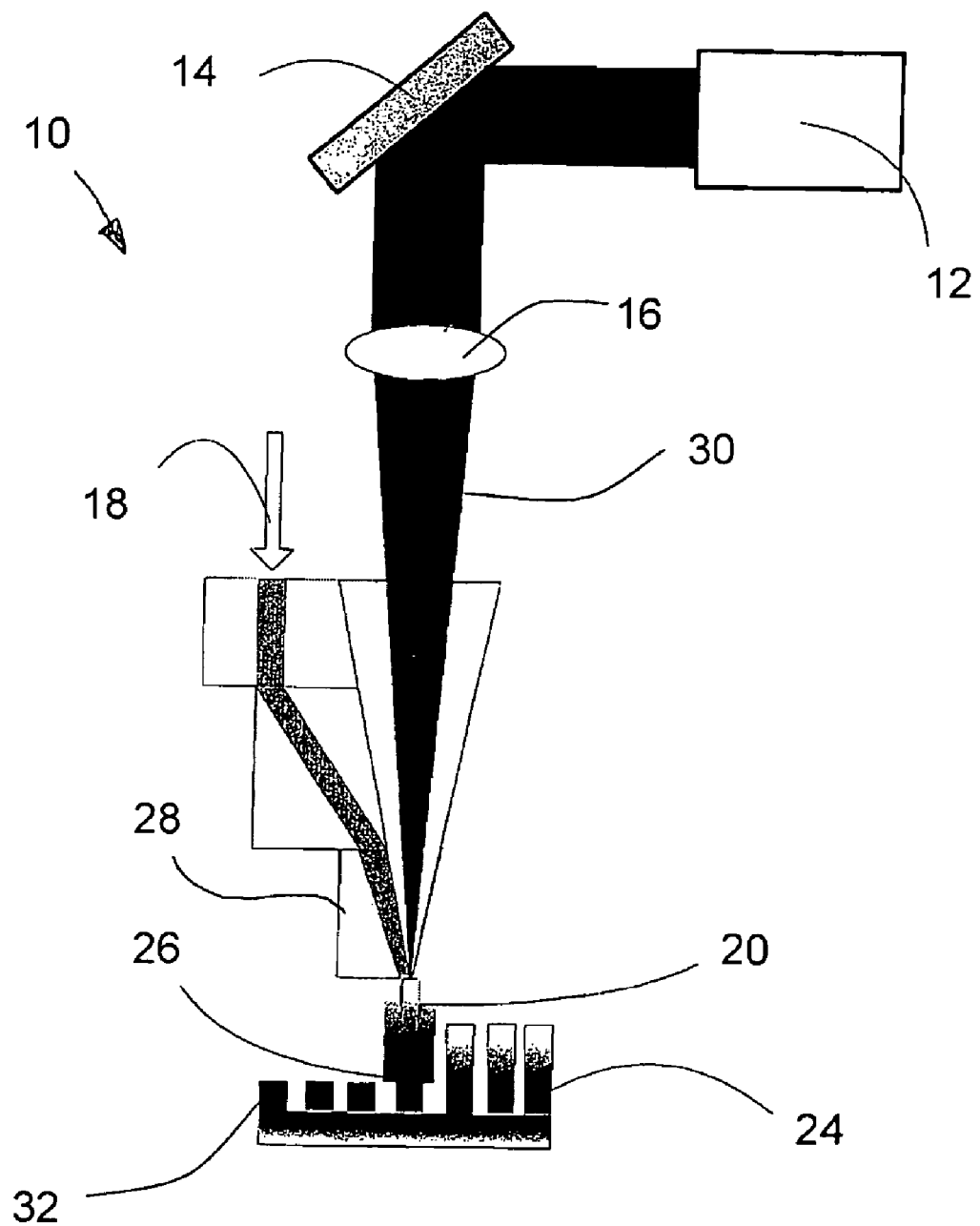
FIG. 1 illustrates the laser sintering apparatus of the present invention.

Referring to the drawing, FIG. 1 illustrates the laser sintering apparatus 10 including a laser 12, mirror 14 and a focusing lens 16. In operation, the laser beam 30 from the laser 12 is directed by the mirror 14 to a focusing lens 16, which concentrates or focuses the laser beam into the sintering nozzle 28. The thermoplastic particles 18 are fluidized within an inert carrying gas and co-axial fed and directed through the nozzle 28, into the path of the thermal laser beam 30.

The thermoplastic particles 18 in the presence of the laser beam 30 is raised above the glass transition temperature and selectively deposited, for example, on an X-Y rotary table 32. Then, under a continuous feed 20 of the thermoplastic particles 18 at the deposition point 22, the movement of the X-Y rotary table 32 facilitates the formation of the final pad geometry 24, including, specific features, such as, grooves. Note, porosity and material composition can be altered as a function of the thermoplastic feed rate, carrier gas flow rate, thermoplastic properties, and by varying the ratio of the thermoplastic particles 18. Also, when used in conjunction with the X-Y rotary table 32, it is possible to create functional gradient materials that can be deposited at specific locations and combinations under unique sintering conditions throughout the pad. Note, in addition to or in lieu of movement of the table 32, the laser beam 30 may be moved as desired to achieve, for example, the final pad geometry and other specific features.

Thermoplastic polymers 18 are generally viscoelastic, and their temperature/viscosity behavior can be complex. Polymer behavior over a wide temperature range can be classified into three basic regions. At low temperatures, polymers behave as glassy, brittle solids, exhibiting predominantly elastic behavior. The upper temperature boundary for this region is often referred to as the glass transition temperature or "Tg". Above the Tg, but below the melting point of the polymer, viscous characteristics become more significant and polymers exhibit both viscous and elastic effects. In this region, the polymer is capable of considerable deformation when stress is applied. When the stress is removed, complete recovery may not occur, due to permanent movement and rearrangement of the molecular structure of the polymer. Above the melting point, the polymer tends to behave as a viscous liquid, generally exhibiting permanent deformation when stress is applied.

The processes of the present invention are preferably conducted below the melting point of the thermoplastic particulate material employed. Above the melting point of the material, rapid liquid sintering makes the process difficult to control, particularly since a precisely regulated and uniform pore structure is preferred. Also above the melting point, thermal gradients tend to cause variations in sintering rate and can cause a non-uniform pore structure in the final article. Also, sintering above the polymer's melt temperature tends to cause unwanted deformation of the sintered product due to viscous flow.

Note, thermoplastics can be readily converted into a powder using conventional techniques, such as, cryogenic milling, and the powdered thermoplastics will generally exhibit well defined thermal characteristics, including thermal stability as temperatures approach the thermoplastic's melting point. The thermoplastic material can be selected according to hardness, elastic moduli, chemical durability, and abrasion resistance. Examples of thermoplastic polymers that may be used in the processes of the present invention are polyurethanes, polyamides, polycarbonates, polyacrylates (including methacrylates and acrylates), polysulfones, and polyesters.

Preferably, the thermoplastic polymers of the present invention are sufficiently hydrophilic to provide a critical surface tension greater than or equal to 34 milliNewtons per meter, more preferably greater than or equal to 37 milliNewtons per meter and most preferably greater than or equal to 40 milliNewtons per meter. Critical surface tension defines the wettability of a solid surface by noting the lowest surface tension a liquid can have and still exhibit a contact angle greater than zero degrees on that solid. Thus, polymers with higher critical surface tensions are more readily wet and are therefore more hydrophilic.

Preferred thermoplastic particles 18 comprise urethanes, carbonates, amides, sulfones, vinyl chlorides, acrylates, methacrylates, vinyl alcohols, esters or acrylamides. Useful thermoplastics (from which a powder can be made) in accordance with the present invention have a modulus of 1 to 200 MegaPascal and an elongation to break in the range of 25% to 1000%, more preferably 50%-500% and most preferably 100%-350%.

Preferably, the polishing pad of the present invention has a porosity between 10 to 50 percent. More preferably, the polishing pad has a porosity between 10 to 40 percent. Most preferably, the polishing pad has a porosity between 20 to 30 percent. In addition, the polishing pad of the present invention has a density between 0.3 g/cm$^3$ to 1.5 g/cm$^3$. More preferably, the polishing pad has a density of about 0.5 g/cm$^3$ to about 1.4 g/cm$^3$. Most preferably, the polishing pad has a density of about 0.8 g/cm$^3$ to about 1.2 g/cm$^3$.

Figure 2:
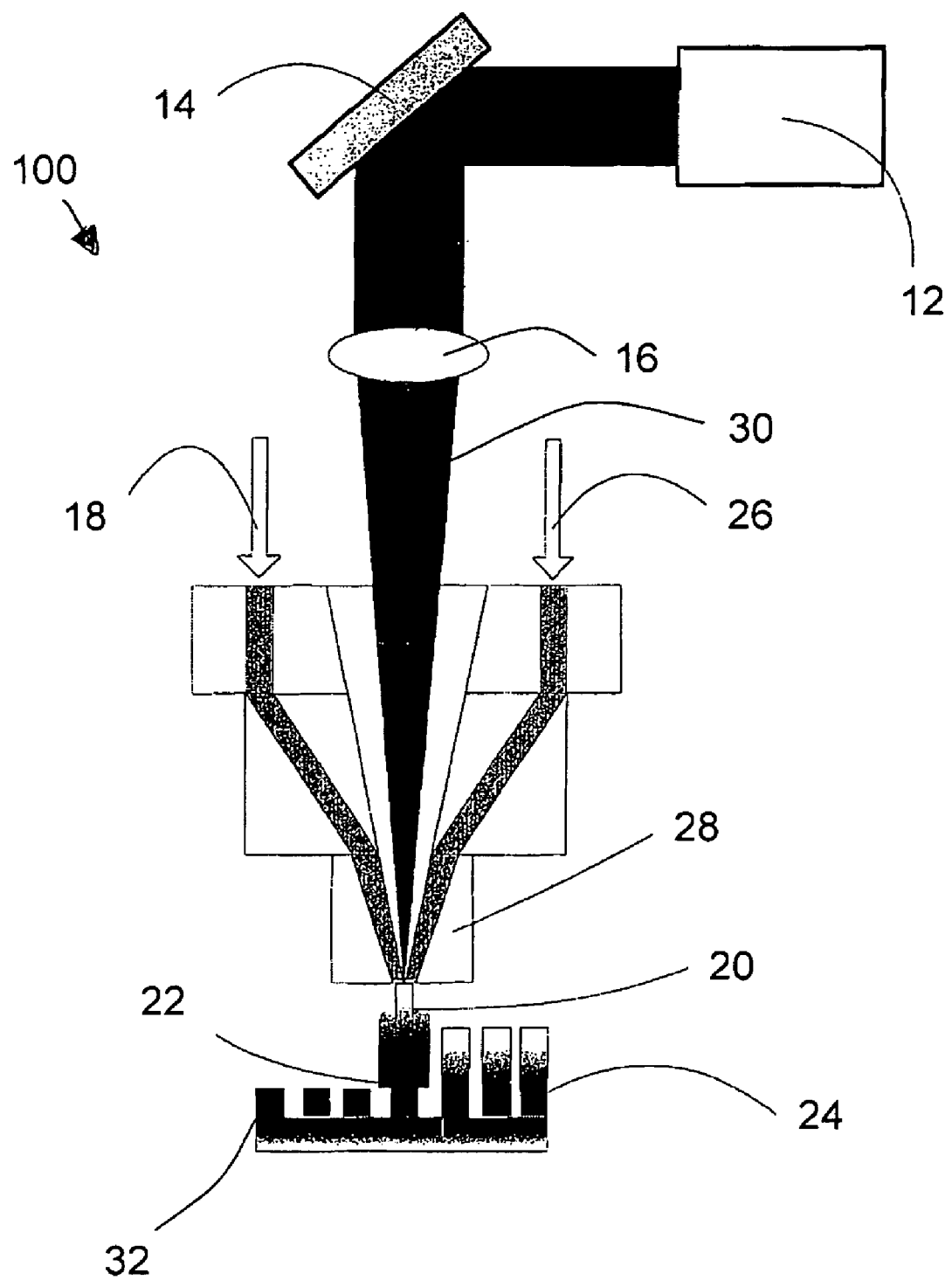
FIG. 2 illustrates another embodiment of the laser sintering apparatus of the present invention.

Referring now to FIG. 2, sintering apparatus 100 includes a laser 12, mirror 14 and a focusing lens 16. In operation, the laser beam 30 from the laser 12 is directed by the mirror 14 to a focusing lens 16, which concentrates or focuses the laser beam 30 into the sintering nozzle 28. The thermoplastic particles 18, 26 are fluidized within an inert carrying gas and co-axial fed and directed through the nozzle 28, into the path of the thermal laser beam 30.

The thermoplastic particles 18, 26 in the presence of the laser beam 30 is raised above the glass transition temperature and selectively deposited, for example, on an X-Y rotary table 32. Then, under a continuous feed 20 of the thermoplastic particles 18, 26 at the deposition point 22, the movement of the X-Y rotary table 32 facilitates the formation of the final pad geometry 24, including, specific features, such as, grooves. Note, porosity and material composition can be altered as a function of the thermoplastic feed rate, carrier gas flow rate, thermoplastic properties, and by varying the ratio of the thermoplastic particles 18, 26. In the present invention, when used in conjunction with the X-Y rotary table 32, it is possible to create functional gradient materials that can be deposited at specific locations and combinations under unique sintering conditions throughout the pad. Note, in addition to or in lieu of movement of the table 32, the laser beam 30 may be moved as desired to achieve, for example, the final pad geometry and other specific features.

If mixtures of thermoplastic particles (18, 26) are used, then at least about 20 weight percent of the thermoplastic particles are hydrophilic as described above, e.g., provides a critical surface tension greater than or equal to 34 milliNewtons per meter. The different thermoplastic particles or materials can be blended, and powders can be created from the blend. Alternatively, different thermoplastic materials can be made into powders individually and thereafter combined as a blend of dissimilar powders. By combining different thermoplastics, physical properties can be chosen to provide improved processing ability, such as, improved machining. In addition, processing flexibility, such as, backing filling porosity can be achieved utilizing the thermoplastic particles of the present invention. Other thermoplastics can be chosen, having improved hydrophilicity, improved elongation to break, improved resistance to plastic flow, etc., to improve pad performance.

While any size particle may be employed, the processes of the present invention preferably use particles having an average diameter in the range of 5 to 500 microns. More preferably, the present invention uses particles having an average diameter in the range of 2 to 200 microns. Such an average diameter range is well suited for laser sintering to produce a macroscopically smooth final pad surface that is free from large gaps or crevices. This improves the mechanical durability of the sintered product and improves the polishing performance of the pad. As sintering proceeds, plastic flow at the particle boundaries leads to particle coalescence and a corresponding shrinkage of the inter-particle void volume.

Although a wide variety of thermoplastic materials are commercially available and usable as starting materials in the present invention, the range of utility may be considerably enhanced by employing mixtures of two different thermoplastic powders. By intimately mixing two materials, composite structures may be produced that have mechanical properties which may be different than either material individually, and dissimilar material mixtures may be produced from materials that cannot be synthesized directly due to material incompatibility. Of particular utility is the use of a mixture wherein one of the components has a lower melting point than the other. When such a mixture is processed at a temperature not to exceed the melting point of the lower melting component, laser sintering may be effected with significantly less chance of distortion.

Preferred combinations of particles include mixtures of particles containing polyurethane with particles containing polyethylene, polypropylene, nylon, polyester or a combination thereof. The polyurethane particles can provide advantageous pad properties (e.g., modulus, elongation to break, critical surface tension, etc.) and the other particles have been found to be particularly useful in improving processability. In one embodiment, at least 10 weight percent of the particles comprise polyurethane, more preferably at least 20 weight percent and most preferably at least 65 weight percent of the particles comprise polyurethane. A preferred particle to be mixed with the polyurethane particles comprises polyethylene.

Note, as discussed above, laser 12 can be moved in any direction (i.e., x, y or z plane) to accommodate numerous designs or configurations as desired. In addition, any supporting member (e.g., table 32) may be moved relative to the laser 12 to further accommodate numerous designs or configurations as desired. Also, the laser beam may be utilized in conjunction with a high pressure waterjet to reduce the heat that may be produced by conventional laser processes. In addition, the XY table may be temperature controlled (e.g., by chilling) to reduce the heat and reduce the production time.

In the present embodiment, the laser 12 used for laser sintering may be pulsed thermal lasers that have a relatively low duty cycle. Optionally, laser 12 may be a continuous laser that is shuttered (i.e., the pulse width (time) is very short compared to the time between pulses). The peak intensity and fluence of the laser is given by:

Intensity (Watts/cm$^2$)=peak power (W)/focal spot area (cm$^2$)

Fluence (Joules/cm$^2$)=laser pulse energy (J)/focal spot area (cm$^2$) while the peak power is:

Peak power (W)=pulse energy (J)/pulse duration (sec)

Example lasers are STS™ Series lasers from PRC Laser Corporation. Thermal laser ablation is preferred.

Accordingly, the present invention provides a method for producing a polishing pad using thermal laser ablation techniques. For example, by feeding the laser-ablated thermoplastic particles onto a table, a polishing pad can be formed having predetermined final pad geometries and specific features, such as, grooves. In addition, porosity and material composition can be altered as a function of the thermoplastic feed rate, carrier gas flow rate, thermoplastic properties, and by varying the ratio of the thermoplastic particles. Also, when used in conjunction with a movable table, the present invention allows creation of functional gradient materials that can be deposited at specific locations and combinations under unique sintering conditions throughout the pad.

What is claimed is:

1. A method of manufacturing a porous chemical mechanical polishing pad comprising:
   focusing a laser beam from a laser into a sintering nozzle;
   injecting fluidized thermoplastic particles into the sintering nozzle via an injection port;
   sintering the fluidized thermoplastic particles with the laser beam to form sintered thermoplastic particles; and
   selectively depositing the sintered thermoplastic particles onto a table to form the polishing pad.

2. The method of claim 1 wherein the sintered thermoplastic particles has an average particle size between 5 to 500 microns.

3. The method of claim 1 wherein the sintered thermoplastic particles comprise a thermoplastic selected from urethanes, carbonates, amides, sulfones, vinyl chlorides, acrylates, methacrylates, vinyl alcohols, esters and acrylamides.

4. The method of claim 1 wherein the polishing pad has a porosity of about 10 to 50 percent.

5. The method of claim 1 wherein the polishing pad has a density of about 0.3 g/cm 3 to about 1.5 g/cm 3.

6. A method of manufacturing a porous chemical mechanical polishing pad comprising:
   focusing a laser beam from a laser into a sintering nozzle;
   injecting a first fluidized thermoplastic particles into the sintering nozzle via a first injection port;
   injecting at least a second fluidized thermoplastic particles into the sintering nozzle via at least a second injection port;
   sintering the first and second thermoplastic particles with the laser beam to form sintered thermoplastic particles; and
   depositing the sintered thermoplastic particles onto a movable table to form the polishing pad.

7. The method of claim 6 wherein at least 10 weight percent of the sintered thermoplastic particles comprise polyurethane.

8. The method of claim 6 wherein the sintered thermoplastic particles comprise a mixture of particles containing polyurethane and particles containing a material selected from the group consisting of polyethylene, polypropylene, nylon, polyester and combinations thereof.

9. The method of claim 6 wherein the mixture comprises thermoplastic polymers selected from the group consisting of polyurethanes, polyamides, polycarbonates, polyacrylates, methacrylates, acrylates, polysulfones, and polyesters.

10. A method of manufacturing a porous chemical mechanical polishing pad comprising:
    focusing a laser beam from a laser into a sintering nozzle;
    injecting fluidized thermoplastic particles into the sintering nozzle via an injection port;
    sintering the thermoplastic particles at a temperature above the glass transition temperature of the fluidized thermoplastic particles but below the melting point of the fluidized thermoplastic polymeric particles to form sintered thermoplastic particles; and
    depositing the sintered thermoplastic particles onto a movable table to form the polishing pad.

* * * * *